Sept. 14, 1943.                H. S. BLY                    2,329,383
                              LAWN MOWER
                          Filed July 21, 1941          3 Sheets-Sheet 1
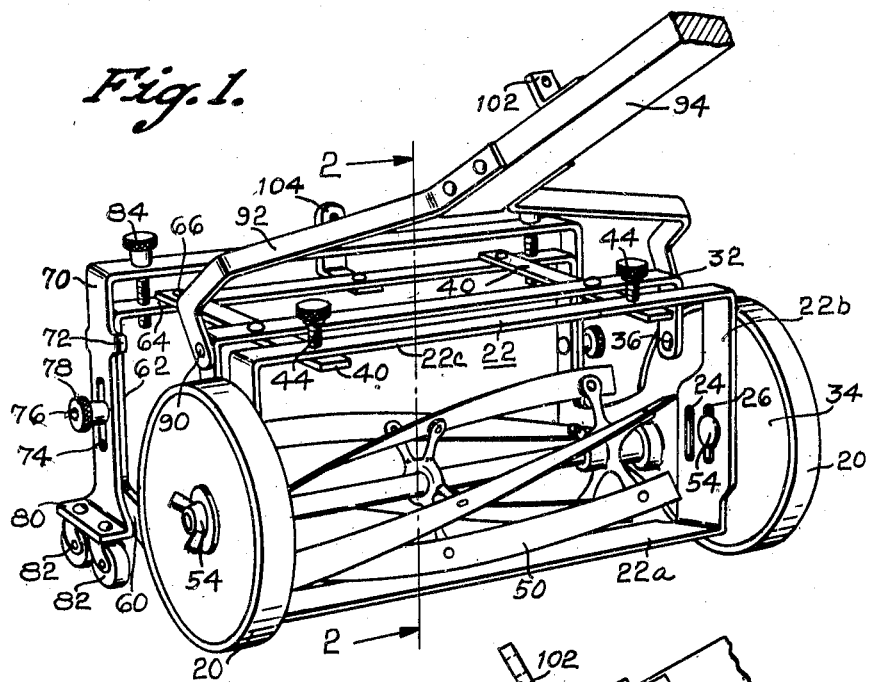
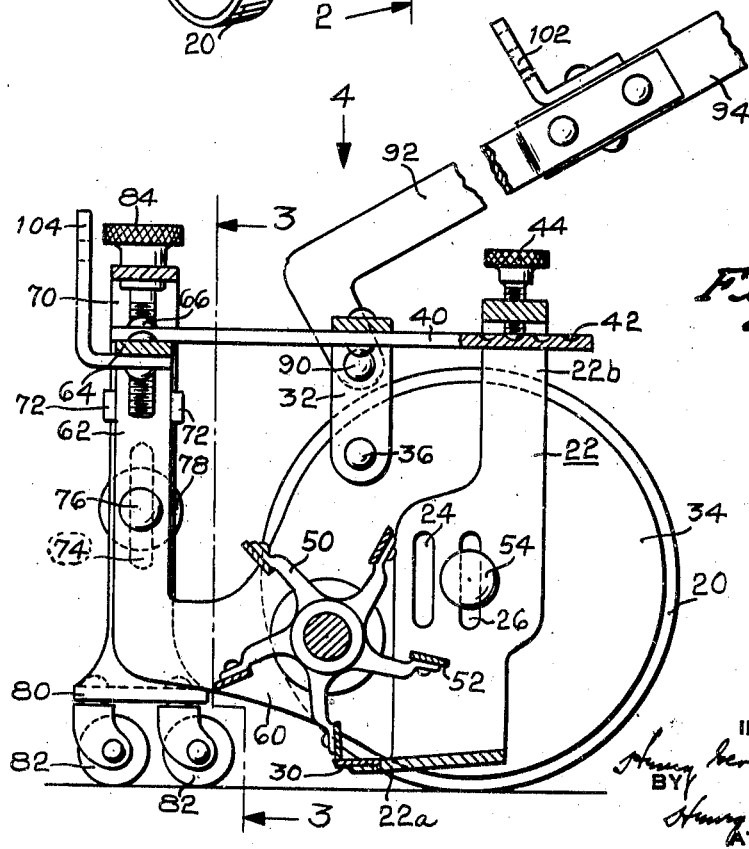

Sept. 14, 1943.  H. S. BLY  2,329,383
LAWN MOWER
Filed July 21, 1941  3 Sheets-Sheet 2
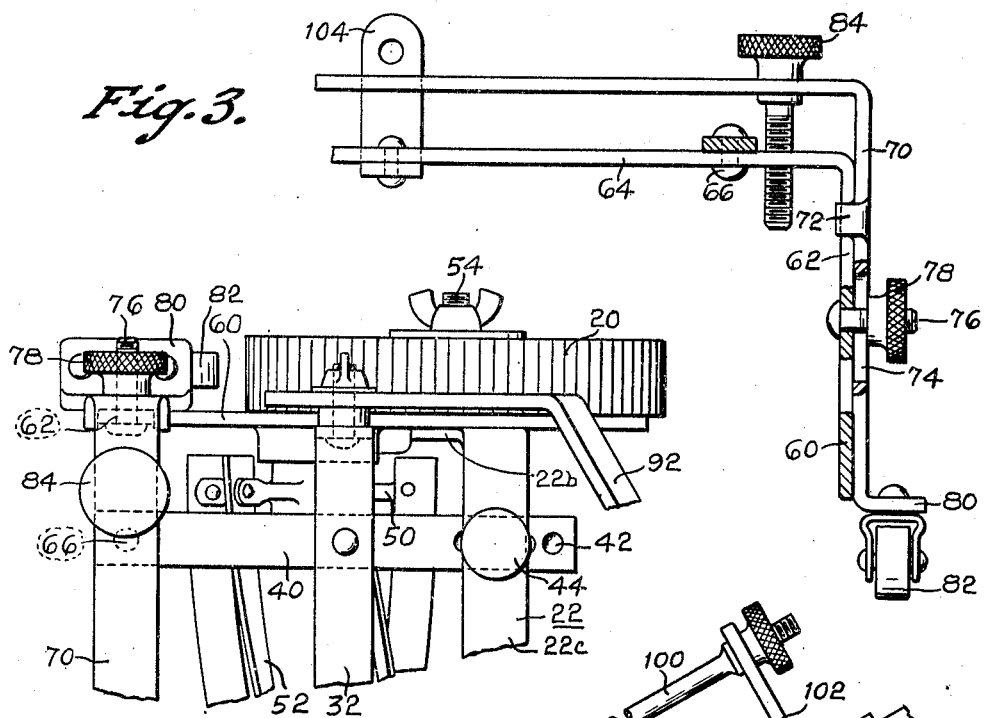
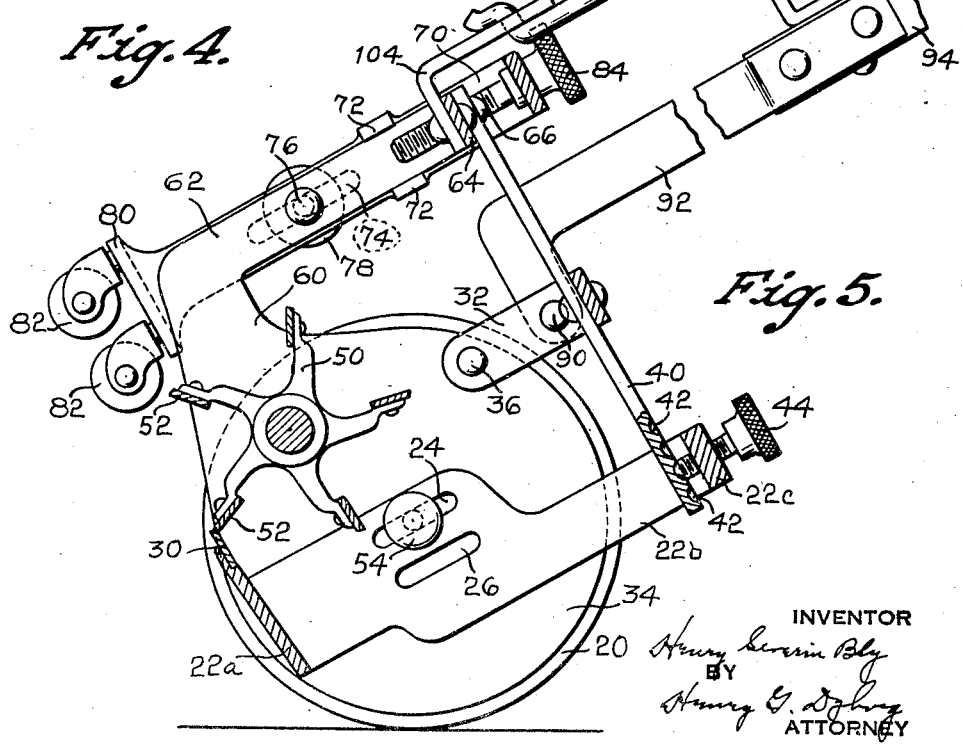
INVENTOR
Henry Severin Bly
BY
Henry G. Dyke
ATTORNEY Sept. 14, 1943.　　　H. S. BLY　　　2,329,383
LAWN MOWER
Filed July 21, 1941　　　3 Sheets-Sheet 3
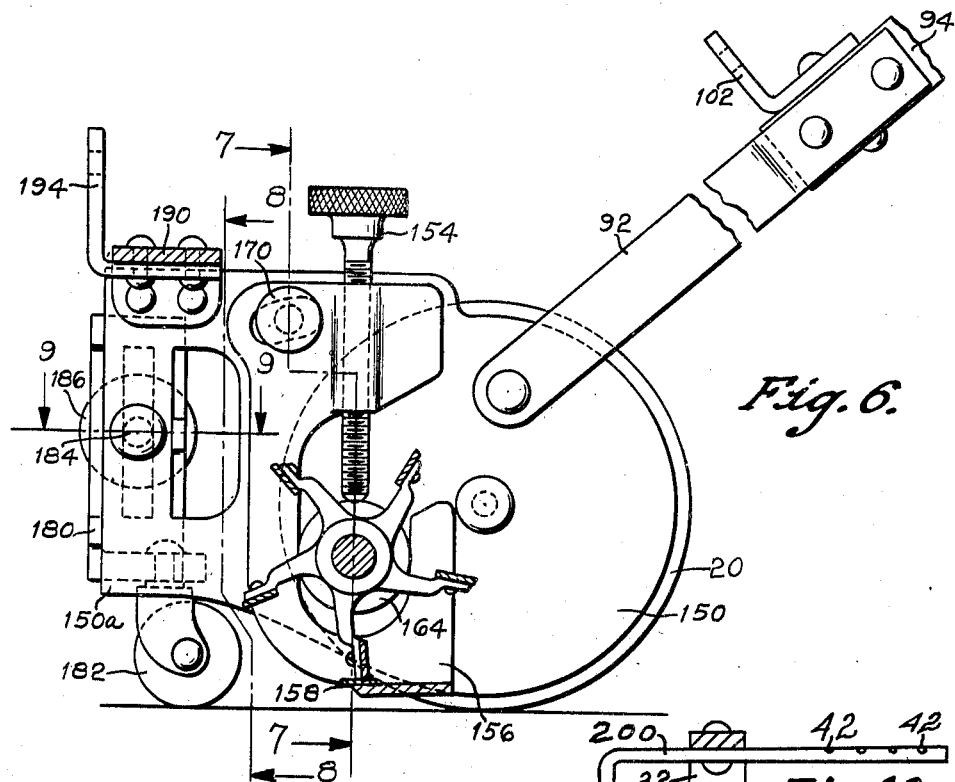
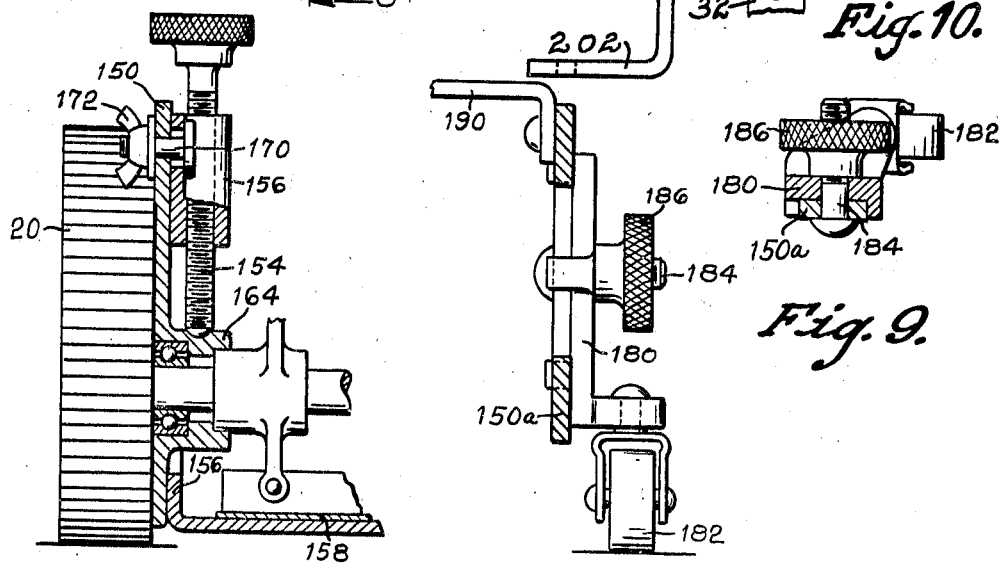
INVENTOR
Henry Servein Bly
BY
Henry G. Dybvig
ATTORNEY Patented Sept. 14, 1943

2,329,383

UNITED STATES PATENT OFFICE 2,329,383

LAWN MOWER

Henry Severin Bly, Redfield, S. Dak.

Application July 21, 1941, Serial No. 403,389

7 Claims. (Cl. 56—252)

This invention relates to lawn mowers and more particularly to a lawn mower adapted to cut tall, tough grass and to cut fine grass.

In cutting the grass on lawns, parks and the like, certain types of obnoxious weeds present difficulty in mowing, in that such weeds shoot up very rapidly, especially near the seeding season, to a height too high for cutting with conventional reel type lawn mowers.

An object of this invention is to provide a lawn mower having one position for cutting the tops of the tall, obnoxious weeds and tall grass and another position for making a close cut.

Another object of this invention is to provide a lawn mower such that the cutting blade will not raise from the ground when the mower encounters tough grass.

Another object of this invention is to provide a stationary cutting blade that has two positions, one for use when cutting short grass and the other for cutting tall grass.

Another object of this invention is to provide micrometer adjustments adjusting the cutting blade both vertically and horizontally with respect to the cutting reel.

Another object of this invention is to provide a lawn mower wherein the parts are oriented or rotated from one position to another when changing the cut from a close cut to a long cut, or vice versa.

Another object of this invention is to provide a support for the stationary cutting blade suspended from the axis of the drive wheels of the lawn mower.

Another object of this invention is to provide means for manually controlling the height of the long cut.

Another object of this invention is to provide a truck mounted ahead of the drive wheels for engagement with the ground when the mower is used in making a short cut, which truck may be adjusted relative to the cutter blade so as to change the distance of the cutter blade from the ground.

Other objects and advantages reside in the construction of parts, the combination thereof and the mode of operation, as will become more apparent from the following description.

In the drawings,

Figure 1 is a perspective view of the preferred embodiment of the lawn mower as viewed from the rear.

Figure 2 is a cross sectional view of the lawn mower taken substantially on the line 2—2 of Figure 1.

Figure 3 is a fragmentary, cross sectional view taken substantially on the line 3—3 of Figure 2.

Figure 4 is a top plan view of one end looking in the direction of the arrow 4 in Figure 2.

Figure 5 is a cross sectional view of the lawn mower when it is tilted into the position for cutting tall grass, weeds and the like.

Figure 6 is a transverse, cross sectional view of a modification.

Figure 7 is a fragmentary, cross sectional view, taken substantially on the line 7—7 of Figure 6.

Figure 8 is a fragmentary, cross sectional view, taken substantially on the line 8—8 of Figure 6.

Figure 9 is a fragmentary, cross sectional view, taken substantially on the line 9—9 of Figure 6.

Figure 10 discloses a modified form of a supporting member.

The lawn mower disclosed herein is adapted for making a long or a high cut, so as to remove the tops of the tall grass, weeds and the like, and a short cut for cutting the fine grass to the conventional height. This has been accomplished by mounting the cutter bar ahead of the position of traction of the drive wheels and rotating the position of the cutter bar from a down position to an up position, or vice versa. When the cutter bar is in the down position, it cuts the grass close to the ground. When it is tilted to the up position, the tall grass is cut at a considerable height from the ground. The cutter bar is preferably adjusted relative to the reel when it is raised from the low position to the high position, so as to cause the cutter bar to be located below the cutting reel in either position.

In order to accomplish this result, the cutter bar has been mounted upon a rectangular open frame. This rectangular frame is provided with two pairs of slots, one on either side, one slot being used when making a short cut and the other being used when making a long cut. This rectangular frame supporting the cutter bar is provided with micrometer adjusting devices for adjusting the relative position of the blades with respect to the cutting reel. Ground engaging means are mounted in advance of the cutting bar and ahead of the line of traction of the drive wheels. Micrometer adjustments have been provided for adjusting this ground engaging means, to thereby adjust the height of the short cut, as will appear more fully from the detailed description of the device that follows.

Referring to the drawings, the reference character 20 indicates conventional drive wheels used on lawn mowers. A rectangular frame 22 is mounted between the wheels and in contact with end frame members 34. The bottom bar 22a of the rectangular frame terminates in a cutting edge or blade 30. Each of the end portions 22b of the rectangular frame is provided with a pair of slots 24 and 26. The slots 24 in the end members 22b are used when the mower is used in cutting tall grass, weeds, et cetera, and the slots 26 are used for short cuts as will appear more fully later.

An inverted U-shaped beam member 32 extends across between the wheels 20. The U-shaped beam member is attached to the end frame members 34. These end frame members are mounted within each of the wheels 20. Suitable bolts 36 are used to hold the ends of the beam member 32 in fixed relation with respect to the frame members 34.

The beam member 32 supports a pair of horizontally disposed supporting members 40, one near each end of the beam member 32. The rear end of member 40 is provided with a plurality of recesses 42 forming seats for the ends of set screws 44, provided with suitable knurled heads, threadedly engaging the top portion 22c of frame member 22.

The blade 30 is raised or lowered by adjusting the screws 44, thereby adjusting the rectangular frame 22 with respect to the cutting reel 50, having a plurality of spiral or helical cutting blades 52, as is well known to those skilled in the art. After adjusting the cutting blade in proper position, the screw or nut 54 passing through the slot 24 or 26, as the case may be, is tightened, so as to clamp the end frame members 22b into engagement with the frame members 34, so as to rigidly hold the cutting blade 30 in any adjusted position. This screw or nut 54 forms the axis about which the wheels 20 rotate.

As may best be seen by referring to Figures 2 and 4, the cutting reel engages the cutting blade 30 in front of the points of contact of the drive wheels 20 with the ground, for reasons that will appear more fully later.

The frames 34 are provided with forwardly projecting extensions 60 merging into upwardly directed arms 62 integral with a transverse beam 64. The forward ends of supporting members 40 are secured to the beam 64 by suitable rivets 66. Thus, it may be seen that the U-shaped beam member 32, members 40, the end frame members 34 merging into the forward extensions 60 and the arms 62 form a unitary, rigid structure.

The forward portion of the lawn mower is supported upon a truck assembly including an inverted U-shaped frame member 70 that is juxtaposed upon the outside of the arms 62, as best seen in Figure 3. The legs of the inverted U-shaped member 70 are provided with lugs 72 providing a guide for aligning the inverted U-shaped member 70 with the arms 62. Member 70 is mounted for vertical adjustment with respect to the arms 62. This may be accomplished by the slot 74 receiving bolts 76 secured to the upwardly directed arms 62 and held in position by suitable knurled nuts 78. The lower ends of the legs of the inverted U-shaped member 70 are provided with outwardly projecting flange portions 80 supporting suitable rollers 82. The rollers 82 cooperate with the main wheels 20 to bear the weight of the lawn mower assembly.

The cutting bar and reel may be raised or lowered with respect to the ground by loosening the nuts 78, then rotating knurled screws 84 threadedly engaging the transverse beam 64. After adjustment, the nuts 78 are again tightened. This adjustment controls the height of the short cut position of the lawn mower.

The inverted U-shaped beam member 32 is provided with a pair of outwardly projecting studs 90 supporting a pair of handle brackets 92, one on each side of the mower. The brackets 92 are bolted to the push handle 94, which may be a handle similar to handles used on conventional lawn mowers.

The operator pushes the lawn mower by the handle 94. When the lawn mower encounters tough, thick grass, there is not a tendency for the cutting bar to lift from the ground, as in conventional lawn mowers, in that the cutting bar and the reel are located in front of the point of contact of the main drive wheels 20 with respect to the ground. The additional force that may be required to push the lawn mower through dense, heavy grass is absorbed by the rollers 82, thereby insuring a uniform cut, irrespective of the density of the grass, the toughness thereof, et cetera.

For extremely tall grass the mower assembly is rotated about the axis 54, so as to raise the cutting bar and the reel from the ground, as clearly seen in Figure 5. The mower is held in this position by a suitable link 100, having one end fastened to a bracket 102 by a knurled nut 106. This bracket 102 is fixedly attached to the handle 94. The opposite end of the link 100 is hooked into a suitable aperture in a bracket 104 carried by the transverse beam 64. By this arrangement, the cutter bar 30 may be raised several inches from the ground, depending entirely upon the size of the wheels 20 and the angular position of the handle 94.

In order to retract the cutting bar 30, so as to position the cutting bar in a position somewhat below the cutting reel, the frame member 22 is shifted so that the screw 54 extends through the slot 24 instead of the slot 26 that is used when the mower is adjusted for the short cut position. By this adjustment the cutting bar 30 is lowered and moved rearwardly, when the mower is used in the high cut position. If, for example, the lawn is neglected during vacation period in summer, dandelions and other tall grasses and weeds may be out of reach, that is, too tall for cutting by the use of the conventional lawn mower. This tall grass may be cut by adjusting the lawn mower disclosed herein into the high cut position, when the tall grass and weeds are cut several inches from the ground. After the tall grass has been cut to this height, the mower may then be adjusted into the short cut position, by merely changing the axis 54 from the slot 24 to the slot 26 and readjusting the cutter bar 30 with respect to the reel by means of the knurled screws 44. The lawn may then be given a short cut, as all of the grass is then within reach of the mower. When adjusting the cutting bar from one position to the other, the end of the screws 44 are adjusted from one recess 42 to another, so as to obtain the proper alignment of the cutting bar 30 with respect to the reel. Thus, it is seen that the lawn mower has adjustments whereby the short cut may be changed or it may be adjusted from the short cut to the high cut by tilting the cutter bar and the reel up from the ground.

In the modification disclosed in Figures 6, 7, 8 and 9, the wheels 20 are mounted upon suitable end frame members 150, having a forwardly directed portion 150a. The end frame members adjustably support brackets 156 adapted to support cutter bar 158. Each bracket 156 is provided with a substantially C-shaped opening straddling a boss 164. The sides of the opening snugly fit the sides of the boss 164. Each of the brackets 156 threadedly supports a screw 154 engaging a suitable recess in the boss 164 integral with the end frame 150. The upper end of each bracket 156 supports a screw 170 provided with a suitable wing nut 172. The screw 170 passes through a slot in the end frame 150, so as to change the angular relation of the cutting bar 158 with respect to the reel 160, whenever it is found desirable to do so. The cutter bar and the brackets 156 may be oscillated about the bosses 164 and adjusted horizontally by adjusting the screws 154.

The forwardly extending portion 150a of each end frame 150 supports a bracket 180 mounted upon a roller 182 and held in position by a suitable screw 184 provided with a knurled nut 186. In this modification the height of the short cut is adjusted by loosening the nut 186 and raising or lowering the bracket 180, so as to change the elevation of the cutter bar 158. The distance between the forward portion of the end frame 150a is spanned by a beam and reenforcing member 190, carrying a lug 194 for use with the link 100. The mower disclosed in this modification may be raised for a high cut by using the link 100 the same as disclosed in connection with the preferred embodiment, so as to tilt the reel and the cutter bar up away from the ground. When it is tilted into the up position, the wing nut 172 is preferably loosened and the bracket 156 rotated about the boss 164, so as to lower and move the cutter bar towards the rear. The cutter bar is again adjusted into proper relation with respect to the reel by merely adjusting the screws 154 in their new angular position.

In both the preferred embodiment and the modification the rotating parts may be journalled in suitable roller bearings or ball bearings. The parts may be oiled or lubricated by injecting the lubricant into the bearings under pressure, by the use of grease cups or in any other suitable manner.

As far as the tilting and the adjustment of the cutter bar is concerned, the high cut position and the short cut position may be incorporated into conventional lawn mowers wherein the cutter bar and the reel are located to the rear of the axis of rotation of the drive wheels.

In the modification shown in Figure 10, the bar 200 has been shown for use instead of member 40. The bar 200 has an offset portion 202 adapted to be attached to the bar 64. This bar 64 may be attached either above or below the offset portion 202. By this arrangement more room may be provided for the passage of the cut grass between parts 22a and 22c. The portion 22b could then be lengthened.

Although parts 60 and 64 are shown as integral, these would probably be made in separate portions to facilitate manufacture and assembly.

The rollers 82 may be shifted further to the rear than shown in the preferred embodiment. By shifting the rollers rearwardly, these are then nearer the cutting bar 30, to thereby reduce chances of snubbing the cutting bar against irregular ground.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A lawn mower assembly having a low cutting position and a high cutting position, said lawn mower assembly including a pair of drive wheels coaxially mounted, a frame structure projecting into the drive wheels, a grass cutting reel mounted in said frame, the axis of rotation of the cutting reel being mounted in front of the axis of rotation of the drive wheels, a cutting bar cooperating with the cutting reel to cut the grass, a rectangular frame for supporting the cutting bar, the ends of said rectangular frame contacting said first mentioned frame, each of the ends of the rectangular frame being provided with a pair of slots, means passing through one of the slots for supporting the cutting bar when the mower is mounted in the low cutting position, said means extending through the other slot when the mower is in the high cutting position, so as to shift the cutting bar forwardly relative to the reel when in the high cutting position.

2. A lawn mower assembly having a low cutting position and a high cutting position, said lawn mower assembly including a pair of coaxially mounted drive wheels, a frame structure projecting into the drive wheels, said frame structure including a pair of forwardly extending projections, there being one projection on either side, a cutting reel mounted for rotation in the frame, said cutting reel rotating about an axis mounted in front of the axis of rotation of the drive wheels, a cutter bar mounted in cutting relation with respect to the cutting reel, a substantially inverted U-shaped bar interconnecting the forwardly extending projection on each side, and a truck assembly located in front and to either side of the cutting reel, said truck assembly including an inverted U-shaped member having the legs juxtaposed along the sides of the inverted U-shaped bar, and micrometer means for adjusting the relative position of the U-shaped bar relative to the U-shaped member so as to raise or lower the cutting bar relative to the ground.

3. A lawn mower assembly having a low cutting position and a high cutting position, said lawn mower assembly including a pair of drive wheels, a frame structure projecting into the drive wheels, said frame structure including a pair of hollow bosses projecting inwardly from said frame, a grass cutting reel journalled in said bosses, a cutting bar cooperating with the cutting reel to cut the grass, a pair of brackets having substantially C-shaped openings, the sides of the openings contacting the perimeter of the bosses so that the brackets may be oscillated and adjusted relative to the bosses, a set screw threadedly engaging the brackets and contacting the bosses to adjust the height of the cutting bar, and means for securing the brackets to the frame structure when the cutting bar has been adjusted into position.

4. A lawn mower assembly having a short cutting position and a high cutting position for cutting the tops of tall grass, said lawn mower assembly including a frame, a pair of coaxially disposed drive wheels mounted towards the rear of the frame, a grass cutting reel mounted in the frame so that the axis of rotation of the cutting reel is located in front of the axis of rotation of the drive wheels, said frame cooperating with the reel to form an unobstructed area in front of the reel, an adjustably mounted cutting bar mounted below the cutting reel, said adjustably mounted cutting bar being supported in the frame, means for adjusting the height of the cutting bar when the lawn mower is in the short cut position, a push handle attached to the frame, and means for tilting the frame so as to raise the cutting bar and the reel from the ground, said means changing the angular position between the frame and the push handle so as to lift the forward end of the frame, the cutting bar and the reel from the ground when the lawn mower is adjusted to high cutting position for cutting the tops of tall grass.

5. A lawn mower assembly having a short cutting position and a high cutting position for cutting the tops of tall grass, said lawn mower assembly including a frame, a pair of coaxially disposed drive wheels mounted towards the rear of the frame, a grass cutting reel mounted in the frame so that the axis of rotation of the cutting reel is located in front of the axis of rotation of the drive wheels, said frame cooperating with the reel to form an unobstructed area in front of the reel, an adjustably mounted cutting bar mounted below the reel, said cutting bar being located ahead of the axis of rotation of the drive wheels, roller means mounted towards the front of the frame and to either side of the cutting reel, means for adjustably attaching the roller means to said frame, a push handle attached to the frame, and link means for attaching the forward portion of the frame to a medial position of the push handle, said link means being utilized to adjust the angular relation between the push handle and the frame, said link means when adjusted for high cutting position holding the roller means and the forward end of the frame a distance above the ground when the push handle is in normal operating position so as to sever the tops of tall grass.

6. A lawn mower assembly having a low cutting position and a high cutting position, said lawn mower assembly including a pair of drive wheels, a frame structure projecting into the drive wheels, said frame structure including a pair of hollow bosses projecting inwardly from said frame, a grass cutting reel journalled in said bosses, a pair of brackets having substantially C-shaped openings, the sides of the openings contacting the perimeter of the bosses whereby the brackets may be oscillated and adjusted relative to the bosses, a cutting bar mounted on said brackets and cooperating with the cutting reel to cut the grass, and means for securing the brackets in adjusted position so as to support the cutting bar in proper relation with respect to the cutting reel.

7. A lawn mower assembly having a low cutting position and a high cutting position for severing the tops of tall grass, said lawn mower assembly including a frame, a pair of drive wheels journalled towards the rear of the frame, a grass cutting reel mounted for rotation in said frame, the axis of rotation of the cutting reel being located ahead of the axis of rotation of the wheels, a cutting bar, a pair of members having vertically disposed openings for supporting the cutting bar, means projecting through the openings in said members for adjustably supporting said members and the cutting bar, a pair of rollers adjustably mounted in the forward portion of the frame, there being one roller on either side of the swath to be cut, a push handle pivotally attached to the frame, and means for linking the forward end of the frame to the push handle used in raising the forward end of the frame, the rollers and the cutting bar, together with the reel from the ground into the high cutting position for severing the tops of tall grass when the push handle is in normal operating position.

HENRY SEVERIN BLY